(12) United States Patent
Filiau (10) Patent No.: US 10,945,560 B2
(45) Date of Patent: Mar. 16, 2021

(54) VESSEL INCLUDING ROTATING AND LINEARLY SLIDING HANDLE ASSEMBLY WITH HOOK PORTION

(71) Applicant: Cool Gear International, LLC, Plymouth, MA (US)

(72) Inventor: Cameron Filiau, Lunenburg, MA (US)

(73) Assignee: COOL GEAR INTERNATIONAL, LLC, Plymouth, MA (US)

( * ) Notice: Subject to any disclaimer, the term of this patent is extended or adjusted under 35 U.S.C. 154(b) by 0 days.

(21) Appl. No.: 16/789,779

(22) Filed: Feb. 13, 2020

(65) Prior Publication Data
US 2020/0268211 A1    Aug. 27, 2020

Related U.S. Application Data

(60) Provisional application No. 62/811,020, filed on Feb. 27, 2019.

(51) Int. Cl.
*A47J 45/06* (2006.01)
*F25D 3/08* (2006.01)
*A45F 3/16* (2006.01)

(52) U.S. Cl.
CPC ........... *A47J 45/06* (2013.01); *F25D 3/08* (2013.01); *A45C 2200/20* (2013.01); *A45F 3/16* (2013.01); *F25D 2331/803* (2013.01)

(58) Field of Classification Search
CPC ...... A47J 45/06; F25D 3/08; F25D 2331/803; A45C 2200/20; A45C 13/28; A45C 11/20; A45F 3/16
See application file for complete search history.

(56) References Cited

U.S. PATENT DOCUMENTS

| | | | | |
|---|---|---|---|---|
| 3,490,640 A | * | 1/1970 | Liss | ........................ A47J 45/06 220/814 |
| 3,630,251 A | * | 12/1971 | Ross | ...................... D06F 53/005 220/751 |
| 4,537,044 A | * | 8/1985 | Putnam | ................... A45C 11/20 220/902 |
| 4,566,292 A | * | 1/1986 | Parmet | ...................... F25D 3/08 215/286 |
| 4,608,837 A | * | 9/1986 | Hickey | ................... B65D 25/04 62/390 |
| 5,295,365 A | * | 3/1994 | Redford | .................... F25D 3/08 62/265 |

(Continued)

*Primary Examiner* — Stanton L Krycinski
(74) *Attorney, Agent, or Firm* — King & Spalding LLP (57) ABSTRACT

An apparatus can include: a hollow vessel having a body which includes one or more walls extending upwardly from a base portion to form an opening in fluid communication with an interior space of the body; a handle assembly movably coupled to the body, the handle assembly including an elongated cut-out portion, a first end forming a handle portion, and a second end opposite the first end forming a hook portion; and a coupling member disposed on the one or more walls of the body, the coupling member coupling the handle assembly to the body by extending at least partially into the cut-out portion of the handle assembly. The handle assembly can be configured to rotate about the coupling member and to linearly slide along the coupling member in a direction parallel to the cut-out portion.

24 Claims, 3 Drawing Sheets

(56) References Cited

U.S. PATENT DOCUMENTS 5,806,817 A * 9/1998 Loud .................. E06C 7/14
                                           248/210
8,746,498 B2 * 6/2014 Maldonado ............ B65D 25/22
                                           220/756

* cited by examiner

VESSEL INCLUDING ROTATING AND LINEARLY SLIDING HANDLE ASSEMBLY WITH HOOK PORTION

RELATED APPLICATIONS

The present application is a non-provisional application of and claims priority under 35 U.S.C. § 119 to U.S. Provisional Application No. 62/811,020, entitled "Vessel Including Rotating And Linearly Sliding Handle Assembly With Hook Portion" and filed on Feb. 27, 2019, the entirety of which is incorporated by reference herein.

TECHNICAL FIELD

The present disclosure relates generally to vessels, and more particularly, to a vessel including a rotating and linearly sliding handle assembly with a hook portion.

BACKGROUND

Many vessels designed for food or beverage storage, such as jugs, bottles, coolers, ice chests, and other similar containers, are equipped with handles to enable users to readily transport the vessel to a desired location. Some vessels include rotating handles capable of extending above the vessel body when the vessel is carried or being stowed against the vessel body when the vessel is resting on a surface. However, a surface on which to place the vessel such that the vessel is within reach may not always be available. Additional options for convenient vessel storage are needed.

SUMMARY

The present disclosure provides a vessel including a rotating and linearly sliding handle assembly with a first end forming a handle portion and a second end forming a hook portion capable of latching onto an object, such as a fence, a table edge, or the like, enabling a user to hang the vessel on said object. The handle assembly can be rotated into a carrying position in which the handle portion is located above the vessel, while the hook portion is stowed against the side of the vessel, or into a hanging position in which the hook portion is located at least partially above the vessel and capable of engaging with another object so the vessel can be hung as desired. Furthermore, the handle assembly can slide linearly to allow either the handle portion or the hook portion to extend away from the vessel body depending on the intended use.

In accordance with embodiments of the present disclosure, an apparatus can include: a hollow vessel having a body which includes one or more walls extending upwardly from a base portion to form an opening in fluid communication with an interior space of the body; a handle assembly movably coupled to the body, the handle assembly including an elongated cut-out portion, a first end forming a handle portion, and a second end opposite the first end forming a hook portion; and a coupling member disposed on the one or more walls of the body, the coupling member coupling the handle assembly to the body by extending at least partially into the cut-out portion of the handle assembly. The handle assembly can be configured to rotate about the coupling member and to linearly slide along the coupling member in a direction parallel to the cut-out portion.

The cut-out portion can be formed such that interior walls of the cut-out portion remain in contact with the coupling member during the linear sliding of the handle assembly.

The coupling member can be configured to be positioned at one of a plurality of possible locations inside of the cut-out portion.

The linear sliding of the handle assembly can reposition the coupling member within the cut-out portion.

When the first end forming the handle portion extends upwardly with respect to the vessel, the second end forming the hook portion can be configured to be disposed against the one or more walls of the body.

The cut-out portion can be closer in proximity to the second end forming the hook portion than the first end forming the handle portion.

A linear sliding motion of the handle assembly in a particular direction can terminate upon the coupling member abutting an interior end of the cut-out portion.

The handle assembly can be configured to rotate about the coupling member while the coupling member is positioned at any of a plurality of possible locations inside of the cut-out portion.

When the handle assembly linearly slides along the coupling member in the direction parallel to the cut-out portion, the coupling member can remain stationary.

The hook portion and the handle assembly can be formed as a unitary structure.

The apparatus can further include a connection member rotatably coupled to the body. The connection member can be formed with a coupling member receiving portion configured to receive the coupling member such that the connection member surrounds the coupling member. Also, the connection member can be disposed inside of the cut-out portion of the handle assembly, and the handle assembly can be configured to linearly slide along the connection member in the direction parallel to the cut-out portion.

The cut-out portion can be formed such that interior walls of the cut-out portion remain in contact with the connection member during the linear sliding of the handle assembly.

The interior walls of the cut-out portion may not come into contact with the coupling member during the linear sliding of the handle assembly.

When the handle assembly rotates about the coupling member, the connection member can rotate in unison with the handle assembly.

The connection member can be configured to rotate about the coupling member.

A linear sliding motion of the handle assembly in a particular direction can terminate upon the connection member abutting an interior end of the cut-out portion.

When the handle assembly linearly slides along the coupling member in the direction parallel to the cut-out portion, the connection member can remain stationary.

The connection member can be structurally independent of the coupling member and the handle assembly.

The connection member can be formed with a first rotation stopping member protruding from an inner surface of the coupling member receiving portion, and the body can be formed with a second rotation stopping member protruding from the one or more walls at a location proximate to the coupling member. The first and second rotation stopping members can be configured to interact with each other so as to limit a rotational range of the handle assembly.

The first and second rotation stopping members can be formed such that rotation of the handle assembly in a first direction terminates when the first end forming the handle portion extends directly upward with respect to the vessel, and such that rotation of the handle assembly in a second, opposite direction terminates when the second end forming the hook portion is positioned at least partially above the opening of the body without the handle portion contacting the one or more walls of the body.

BRIEF DESCRIPTION OF THE DRAWINGS

The embodiments herein may be better understood by referring to the following description in conjunction with the accompanying drawings in which like reference numerals indicate identically or functionally similar elements, of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Referring now to embodiments of the present disclosure, the vessel discussed herein can include a handle assembly configured to rotate about a coupling member disposed on a wall of the vessel and also configured to linearly slide along the coupling member. The handle assembly can include a first end at which a handle portion is formed and a second end at which a hook portion is formed. When the handle assembly is rotated such that the handle portion extends directly upward, the vessel is capable of being carried by the handle portion while the hook portion is stowed against the wall of the vessel. Conversely, when the handle assembly is rotated such that the hook portion is at least partially positioned above the vessel, the hook portion is capable of latching onto an object, allowing the vessel to be hung on said object.

Figure 1A:
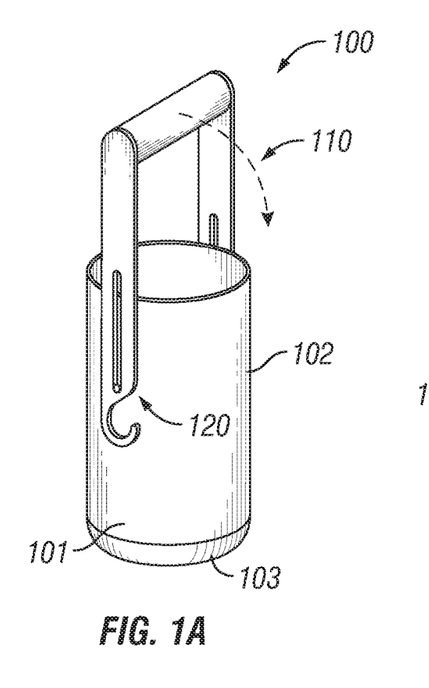
FIGS. 1A-1C are views illustrating an exemplary operation of a vessel including a rotating and linearly sliding handle assembly with a hook portion.
Figure 1B:
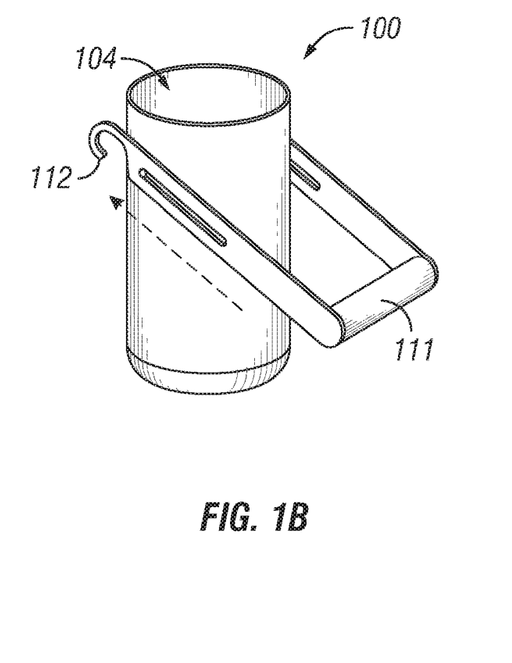
Figure 1C:
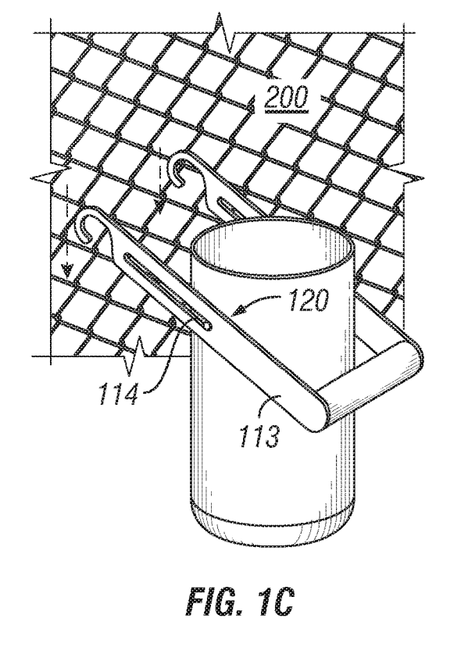

FIGS. 1A-1C are views illustrating an exemplary operation of a vessel 100 including a rotating and linearly sliding handle assembly 110 with a hook portion 112. As shown in FIGS. 1A-1C, the vessel 100 can be a container designed for food or beverage storage, such as a jug, a bottle, a cooler, an ice chest, or any other container consistent with the claims included herein. The vessel 100 can be hollow so as to allow for storage of contents such as food, beverages, ice, etc. The vessel 100 can include a body 101 with one or more walls 102 extending upwardly from a base portion 103 to form an opening 104 in fluid communication with an interior space of the body 101. In some embodiments, the vessel 100 can include a lid (not shown) to seal the opening 104, as would be generally known in the art.

The vessel 100 can be made of various materials, and is not limited to any particular material or combination of materials. In one example, the body 101, one or more walls 102, and base portion 103, or any portion thereof, can be formed of any suitable material, such as plastic or combinations of plastic including, but not limited to, polypropylene (PP), polyethylene terephthalate (PET), high-density polyethylene, low-density polyethylene, vinyl, polystyrene, or the like. The vessel 100 can be constructed using various techniques known in the art including, but not limited to, injection molding, rotational molding, blow molding, and the like. The vessel 100 can be formed with any number of walls 102, including a single-walled construction, a double-walled construction, and so forth. Likewise, the vessel 100 can be insulated or non-insulated.

The vessel 100 can be equipped with a handle assembly 110 to enable a user to carry the vessel 100 to a desired location. The handle assembly 110 can include a first end at which a handle portion 111 is formed. The handle portion 111 can be a portion of the handle assembly 110 which the user can grip for carrying the vessel 100. In some embodiments, the handle portion 111 can be an elongated portion of the handle assembly 110, having a length sufficient to accommodate the width of a user's hand, for example. A support arm 113 can be disposed at each end of the handle portion 111 and can extend therefrom toward the body 101.

The handle assembly 110 can further include a second end, which is opposite the first end, at which a hook portion 112 is formed. The hook portion 112 can include one or more hook-shaped members configured to latch onto an object 200, such as a fence, a handle, a table edge, or the like, allowing the vessel 100 to be suspended therefrom. In one example, the hook portion 112 can include two hook-shaped members, with one hook-shaped member disposed at the end of each of the two support arms 113 opposite the handle portion 111, as shown in FIGS. 1A-1C. Alternatively, the hook portion 112 can include only a single hook-shaped member. It is to be understood, however, that the hook portion 112 can include any number of hook-shaped members.

In some embodiments, the hook portion 112 can be formed integrally with the handle portion 110. That is, the hook portion 112 and the handle assembly 110 can be formed as a unitary structure made of the same material. Alternatively, the hook portion 112 can be connected to the handle assembly 110 but formed as a structure separate from the handle assembly 110.

In addition, the vessel 100 can be equipped with a coupling member 120 that is disposed on the one or more walls 102 of the body 101. As shown in FIGS. 1A-1C, the coupling member 120 can include dual coupling members each of which disposed on opposite sides of the body 101. The coupling member 120, as shown in closer detail in FIGS. 3A and 3B, can protrude outwardly from the one or more walls 102. In some embodiments, the coupling member 120 can be formed integrally with the body 101 (i.e., formed as a unitary structure made of the same material). Alternatively, the coupling member 120 can be connected to the body 101 but formed as a structure separate from the body 101.

The coupling member 120 can connect to the handle assembly 110 so as to movably couple the handle assembly 110 to the body 101. In this regard, the handle portion 110 can be formed with an elongated cut-out portion 114 disposed in the support arms 113. The coupling member 120 connect to the handle assembly 110 by extending at least partially into the cut-out portion 114. The cut-out portion 114 can be formed of various lengths and widths based on the desired rotational range and sliding range of the handle assembly 110, as described below.

The coupling member 120 can couple the handle assembly 110 to the body 101 in such a manner that the handle assembly 110 is configured to both rotate and linearly slide. Firstly, the handle assembly 110 can rotate about the coupling member 120. In some embodiments, the coupling member 120 can be formed with a circular or cylindrical shape so as to facilitate rotation of the handle assembly 110 about the coupling member 120. The rotational range of the handle assembly 110 can vary. In some embodiments, the handle assembly 110 can rotate freely about the vessel 100. In such case, the rotational range of the handle assembly 110 can end upon the handle portion 111 contacting the body 101. In other embodiments, the vessel 100 can be equipped with a structure for limiting the range of rotation of the handle assembly 110 prior to the handle portion 111 contacting the body 101, as described in greater detail below.

The handle assembly 110 can rotate between, at least, a carrying position, in which the handle assembly 110 is positioned to extend directly upward with respect to the vessel 100, and a hanging position, in which the handle assembly 110 is rotated such that the hook portion 112 is at least partially located above the opening 104. In the carrying position, the handle portion 111 can be located directly above the opening 104 of the vessel 100 (e.g., see FIG. 1A), convenient for carrying the vessel 100. Here, the hook portion 112 can be disposed against the one or more walls 102 of the vessel 100, allowing for the hook portion 112 to be stowed when not in use. In the hanging position, the hook portion 112 can be at least partially located above the opening 104 (e.g., see FIG. 1C), convenient for hanging the vessel 100 on an object 200 by the hook portion 112. Here, the handle portion 111 can be located beneath the opening 104. In some embodiments, the coupling member 120 can formed so as to terminate the rotational range of the handle assembly 110 prior to the handle portion 111 contacted the body 101 of the vessel 100, as described in greater detail below; however, the rotational range of the handle assembly 110 need not be limited as such.

In some embodiments, the cut-out portion 114 can be disposed in the support arms 113 closer in proximity to the hook portion 112 than the handle portion 111. Thus, when the handle assembly 110 is being carried, the center of rotation (i.e., the coupling member 120) can be located low on the handle assembly 110, slightly above the hook portion 112, enabling the handle assembly 110 to easily rotate while the handle portion 111 extends above the opening 104.

Secondly, the handle assembly 110 can linearly slide along the coupling member 120. The handle assembly 110, at any given position, can linearly slide in a direction parallel to the elongated cut-out portion 114. As mentioned above, the coupling member 120 can extend at least partially into the cut-out portion 114. Because the coupling member 120 can be fixed to the body 101 of the vessel 100, the coupling member 120 can remain stationary when the handle assembly 110 linearly slides.

The linear sliding of the handle assembly 110 can reposition the coupling member 120 within the cut-out portion 114. That is, the handle assembly 110 can translate linearly such that the coupling member 120 can be positioned at any of a plurality of possible locations inside of the cut-out portion 114. The handle assembly 110 can rotate within the permitted rotational range thereof while the coupling member 120 is positioned at any of the possible locations inside of the cut-out portion 114.

Additionally, the cut-out portion 114 can be formed such that interior walls of the cut-out portion 114 remain in contact with the coupling member 120 during the linear sliding of the handle assembly 110. In some embodiments, the interior walls of the cut-out portion 114 can be shaped in a manner corresponding to or complementing the shape of the outer surface of the coupling member 120, so as to facilitate linear movement of the handle assembly 110 along the coupling member 120.

Furthermore, the linear sliding range of the handle assembly 110 can be determined, at least in part, by the length of the cut-out portion 114 and the width of the coupling member 120. For example, the linear movement of the handle assembly 110 in a particular direction can terminate upon the coupling member 120 abutting an interior end of the cut-out portion 114. As shown in FIGS. 1B and 1C, the coupling member 120 can be positioned so as to abut a first interior end of the cut-out portion 114, proximate to the hook portion 112. As the handle assembly 110 linearly slides so as to extend the hook portion 112 away from the body 101 of the vessel 100, the movement of the handle assembly 110 in such direction can terminate upon the coupling member 120 abutting a second interior end of the cut-out portion 114 opposite the first interior end.

By virtue of the combination of rotational and linear sliding movement described above, a user can grip the handle portion 111 of the handle assembly 110, downwardly rotate the handle assembly 110, and extend the handle assembly 110 so as to raise the hook portion 112 at least partially above the opening 104 of the vessel 100, as demonstrated in FIGS. 1A-1C. This operation can enable the user to adjust the handle assembly 110 into a hanging position, so the hook portion 112 can latch onto various objects 200 for hanging the vessel 100, without removing the user's hand from the handle portion 111. This can further enable the user to use his or her other hand to support the vessel 100 from below, i.e., under the base portion 103. A similar operation is demonstrated in FIGS. 2A-2C, as described below.

Figure 2A:
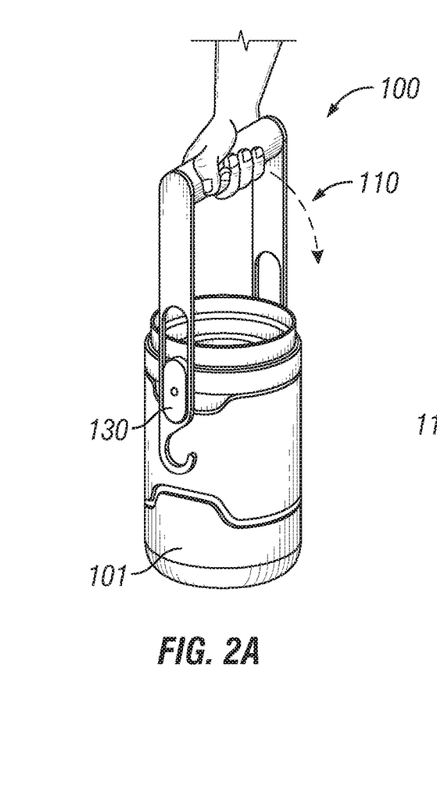
FIGS. 2A-2C are views illustrating an exemplary operation of a vessel including a rotating and linearly sliding handle assembly with a hook portion and a connection member.
Figure 2B:
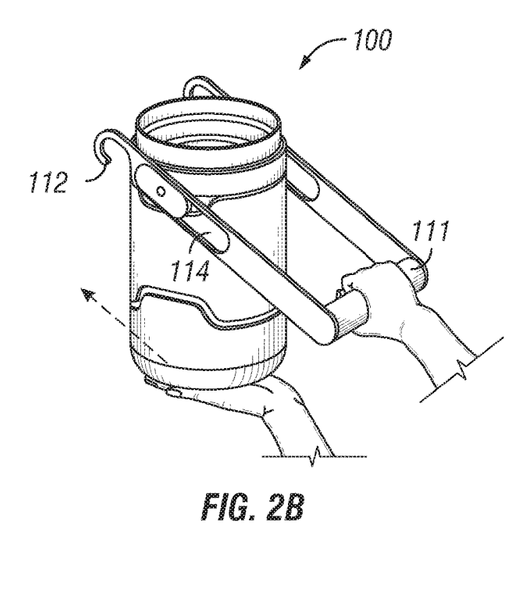
Figure 2C:
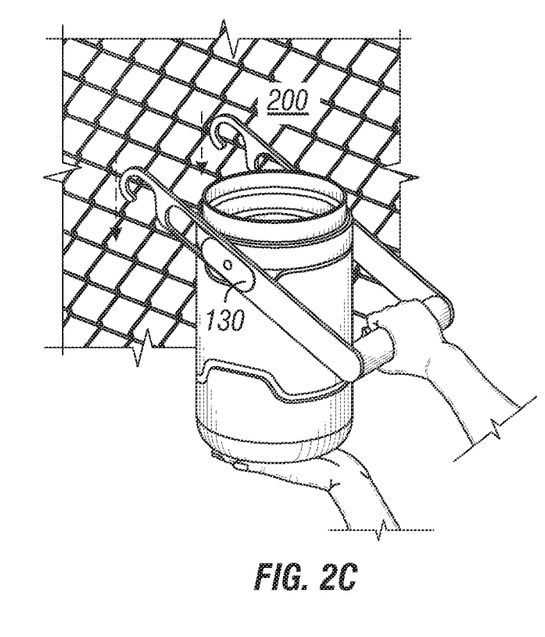

FIGS. 2A-2C are views illustrating an exemplary operation of a vessel 100 including a rotating and linearly sliding handle assembly 110 with a hook portion 112 and a connection member 130. As shown in FIGS. 2A-2C, the vessel 100 can be further equipped with a connection member 130. The connection member 130 can be rotatably coupled to the body 101 of the vessel 100 via the coupling member 120. In some embodiments, the connection member 130 can be structurally independent of the coupling member 120 and the handle assembly 110. In this regard, the connection member 130 can be formed with a coupling member receiving portion 131 configured to receive the coupling member 120. The coupling member receiving portion 131 can be formed in a central region of the connection member 130. Thus, the connection member 130 can be disposed on the coupling member 120, with the coupling member 120 inserted into the coupling member receiving portion 131, such that the connection member 130 surrounds the outer surface of the coupling member 120, as further demonstrated in FIGS. 3A and 3B.

The connection member 130 can be configured to rotate about the coupling member 120. The inner surface of the coupling member receiving portion 131 can be shaped in a manner corresponding to or complementing the shape of the outer surface of the coupling member 120, so as to facilitate the rotational movement of the connection member 130. For example, the coupling member 120 and the coupling member receiving portion 131 can each be circularly or cylindrically shaped to enable the connection member 130 to rotate about the fixed coupling member.

The connection member 130 can be disposed inside of the cut-out portion 114 of the handle assembly 110. In contrast with the embodiments demonstrated in FIGS. 1A-1C, in which the interior walls of the cut-out portion 114 contact the outer surface of the coupling member 120, the interior walls of the cut-out portion 114 can instead contact the outer surface of the connection member 130 while the coupling member 120 is disposed within the coupling member receiving portion 131 of the connection member 130. As such, the handle assembly 110 can be configured to linearly slide along the connection member 130 in a direction parallel to the cut-out portion 114. That is, the interior walls of the cut-out portion 114 can remain in contact with the connection member 130 during the linear sliding of the handle assembly 110, rather than contacting the coupling member 120 directly. It is to be understood that the cut-out portion 114 can be formed with an increased width to accommodate the larger dimensions of the connection member 130.

The outer surface of the connection member 130 can be shaped in a manner corresponding to or complementing the shape of the interior walls of the cut-out portion 114, such that the connection member 130 can be securely disposed within the cut-out portion 114. For example, the edges of the connection member 130 can be shaped with a circular indentation, as shown in FIGS. 3A and 3B, in which outwardly rounded interior walls of the cut-out portion 114 can be inserted, thus allowing the handle assembly 110 to linearly slide as the connection member 130 remains fixed to the coupling member 120, without the handle assembly 100 disconnecting from the connection member 130.

The linear sliding range of the handle assembly 110 can be determined, at least in part, by the length of the cut-out portion 114 and the width of the connection member 130. For example, the linear movement of the handle assembly 110 in a particular direction can terminate upon the connection member 130 abutting an interior end of the cut-out portion 114. As shown in FIGS. 2B and 2C, the coupling member 130 can be positioned so as to abut a first interior end of the cut-out portion 114, proximate to the hook portion 112. As the handle assembly 110 linearly slides so as to extend the hook portion 112 away from the body 101 of the vessel 100, the movement of the handle assembly 110 in such direction can terminate upon the connection member 130 abutting a second interior end of the cut-out portion 114 opposite the first interior end.

Because the connection member 130 can be disposed inside of the cut-out portion 114 of the handle assembly 110, the handle assembly 110 can rotate in unison with the connection member 130 about the coupling member 120. That is, rotation of the handle assembly 110 can cause equivalent rotation of the connection member 130. In some embodiments, though, the connection member 130 and the body 101 can be formed with structure intended to limit the rotational range of the handle assembly 120.

Figure 3A:
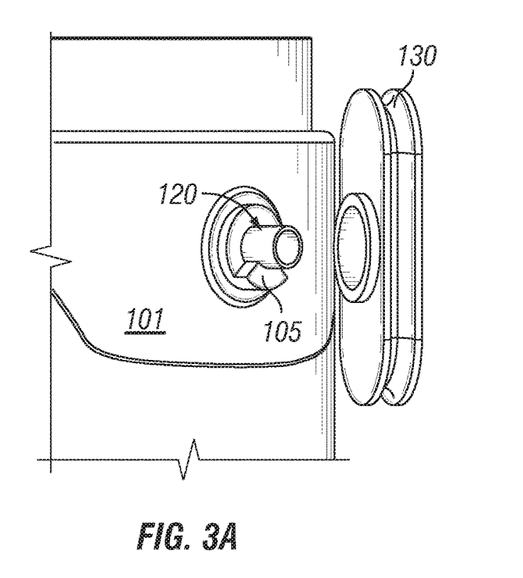
FIGS. 3A and 3B are views illustrating an exemplary interaction between a vessel body and the connection member of FIGS. 2A-2C.
Figure 3B:
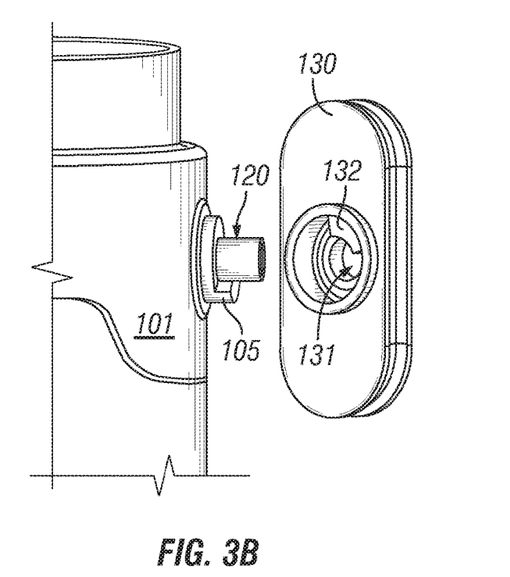

In this regard, FIGS. 3A and 3B are views illustrating an exemplary interaction between the body 101 and the connection member 130. As shown in FIGS. 3A and 3B, which illustrate disassembled views of the vessel 100 and connection member 130, the connection member 130 can be formed with a first rotation stopping member 132 protruding from an inner surface of the coupling member receiving portion 131. In some embodiments, the first rotation stopping member 132 can be formed in an arcuate shape disposed along the inner surface of the circularly shaped coupling member receiving portion 131.

Meanwhile, the body 101 of the vessel 100 can be formed with a second rotation stopping member 105 that corresponds to or complements the first rotation stopping member 132 of the connection member 130. The second rotation stopping member 105 can protrude from the one or more walls 102 at a location proximate to the coupling member 120. In some embodiments, the second rotation stopping member 105 formed in an arcuate shape against the outer surface of the circularly or cylindrically shaped coupling member 120.

The first and second rotation stopping members 132 and 105 can be configured to interact with each other so as to limit a rotational range of the handle assembly 110. Particularly, the first rotation stopping members 132 can be positioned so as to abut the second rotation stopping member 105 during rotation of the handle assembly 110. Thus, the rotational range of the handle assembly 110 can be limited upon the first and second rotation stopping members 132 and 105 coming into contact with each other.

Figure 4A:
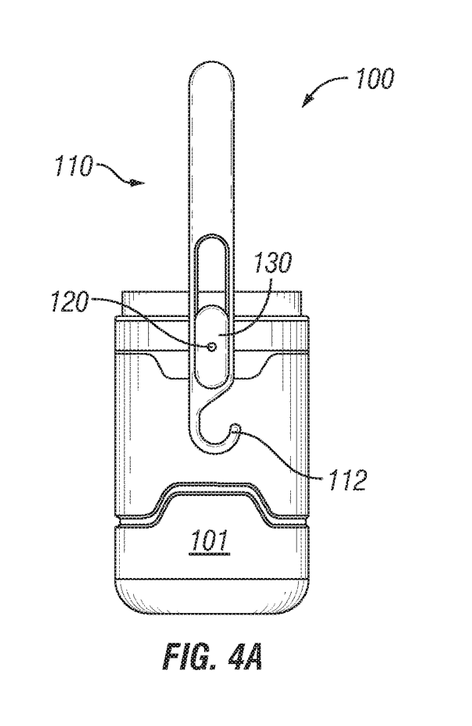
FIGS. 4A and 4B are views illustrating an exemplary rotational range of the vessel of FIGS. 2A-2C.
Figure 4B:
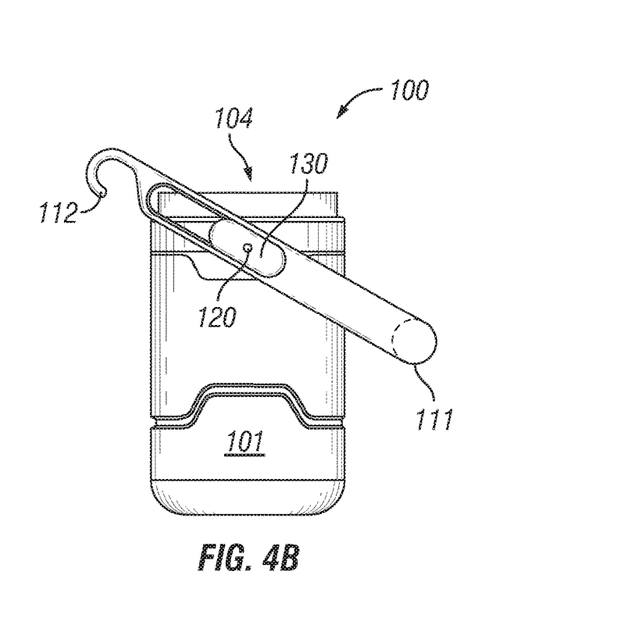

To demonstrate, FIGS. 4A and 4B are views illustrating an exemplary rotational range of the vessel 100. As shown in FIGS. 4A and 4B, the handle assembly 110 can rotate between, at least, a carrying position and a hanging position, consistent with the description thereof provided hereinabove. The first rotation stopping member 132 and the second rotation stopping member 105 can be formed such that respective first ends of the first and second rotation stopping members 132 and 105 abut each other during rotation of the handle assembly 110 in a first direction (toward the carrying position of FIG. 4A), terminating the handle assembly rotation when the handle portion 111 extends directly upward with respect to the vessel 100. Furthermore, the first rotation stopping member 132 and the second rotation stopping member 105 can be formed such that respective second ends of the first and second rotation stopping members 132 and 105, opposite the first ends, abut each other during rotation of the handle assembly 110 in a second direction (toward the hanging position of FIG. 4B), terminating the handle assembly rotation when the hook portion 112 is positioned at least partially above the opening 104 without the handle portion 111 contacting the one or more walls 102 of the body 101. By terminating rotation of the handle assembly 110 in the second direction (toward the hanging position of FIG. 4B) before the handle portion 111 contacts the one or more walls 102, the user can rotate the handle assembly 110 toward the hanging position while holding the handle portion 111 without the user's hand colliding or being pinched against the body 101 of the vessel 100.

Accordingly, the vessel described herein can utilize a rotating and linearly sliding handle assembly formed with a hook portion on one end and a handle portion on another end. When the handle assembly is rotated such that the handle portion extends directly upward, the vessel is capable of being carried by the handle portion while the hook portion is stowed against the wall of the vessel. On the other hand, when the handle assembly is rotated such that the hook portion is at least partially positioned above the vessel, the hook portion is capable of latching onto an object, allowing the vessel to be hung on said object.

The foregoing description has been directed to certain embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus comprising:
   a hollow vessel having a body which includes one or more walls extending upwardly from a base portion to form an opening in fluid communication with an interior space of the body;
   a handle assembly movably coupled to the body, the handle assembly including an elongated cut-out portion, a first end forming a handle portion, and a second end opposite the first end forming a hook portion; and
   a coupling member disposed on the one or more walls of the body, the coupling member coupling the handle assembly to the body by extending at least partially into the cut-out portion of the handle assembly,
   wherein the handle assembly is configured to rotate about the coupling member and to linearly slide along the coupling member in a direction parallel to the cut-out portion,
   wherein, when the first end forming the handle portion extends upwardly with respect to the vessel, the second end forming the hook portion is configured to be disposed against the one or more walls of the body.

2. The apparatus of claim 1, wherein the cut-out portion is formed such that interior walls of the cut-out portion remain in contact with the coupling member during the linear sliding of the handle assembly.

3. The apparatus of claim 1, wherein the coupling member is configured to be positioned at one of a plurality of possible locations inside of the cut-out portion.

4. The apparatus of claim 1, wherein the linear sliding of the handle assembly repositions the coupling member within the cut-out portion.

5. The apparatus of claim 1, wherein the cut-out portion is closer in proximity to the second end forming the hook portion than the first end forming the handle portion.

6. The apparatus of claim 1, wherein a linear sliding motion of the handle assembly in a particular direction terminates upon the coupling member abutting an interior end of the cut-out portion.

7. The apparatus of claim 1, wherein the handle assembly is configured to rotate about the coupling member as the coupling member is positioned at any of a plurality of possible locations inside of the cut-out portion.

8. The apparatus of claim 1, wherein, when the handle assembly linearly slides along the coupling member in the direction parallel to the cut-out portion, the coupling member remains stationary.

9. The apparatus of claim 1, wherein the hook portion and the handle assembly are formed as a unitary structure.

10. The apparatus of claim 1, further comprising a connection member rotatably coupled to the body, the connection member formed with a coupling member receiving portion configured to receive the coupling member such that the connection member surrounds the coupling member,
    wherein the connection member is disposed inside of the cut-out portion of the handle assembly, and the handle assembly is configured to linearly slide along the connection member in the direction parallel to the cut-out portion.

11. The apparatus of claim 10, wherein the cut-out portion is formed such that interior walls of the cut-out portion remain in contact with the connection member during the linear sliding of the handle assembly.

12. The apparatus of claim 11, wherein the interior walls of the cut-out portion do not come into contact with the coupling member during the linear sliding of the handle assembly.

13. The apparatus of claim 10, wherein, when the handle assembly rotates about the coupling member, the connection member rotates in unison with the handle assembly.

14. The apparatus of claim 10, wherein the connection member is configured to rotate about the coupling member.

15. The apparatus of claim 10, wherein a linear sliding motion of the handle assembly in a particular direction terminates upon the connection member abutting an interior end of the cut-out portion.

16. The apparatus of claim 10, wherein, when the handle assembly linearly slides along the coupling member in the direction parallel to the cut-out portion, the connection member remains stationary.

17. The apparatus of claim 10, wherein the connection member is structurally independent of the coupling member and the handle assembly.

18. The apparatus of claim 10, wherein the connection member is formed with a first rotation stopping member protruding from an inner surface of the coupling member receiving portion, and the body is formed with a second rotation stopping member protruding from the one or more walls at a location proximate to the coupling member, the first and second rotation stopping members configured to interact with each other so as to limit a rotational range of the handle assembly.

19. The apparatus of claim 18, wherein the first and second rotation stopping members are formed such that rotation of the handle assembly in a first direction terminates when the first end forming the handle portion extends directly upward with respect to the vessel, and such that rotation of the handle assembly in a second, opposite direction terminates when the second end forming the hook portion is positioned at least partially above the opening of the body without the handle portion contacting the one or more walls of the body.

20. An apparatus comprising:
    a hollow vessel having a body which includes one or more walls extending upwardly from a base portion to form an opening in fluid communication with an interior space of the body;
    a handle assembly movably coupled to the body, the handle assembly including an elongated cut-out portion, a first end forming a handle portion, and a second end opposite the first end forming a hook portion; and a coupling member disposed on the one or more walls of the body, the coupling member coupling the handle assembly to the body by extending at least partially into the cut-out portion of the handle assembly, wherein the handle assembly is configured to rotate about the coupling member and to linearly slide along the coupling member in a direction parallel to the cut-out portion, wherein the cut-out portion is closer in proximity to the second end forming the hook portion than the first end forming the handle portion.

21. The apparatus of claim 20, wherein the linear sliding of the handle assembly repositions the coupling member within the cut-out portion.

22. The apparatus of claim 20, wherein the handle assembly is configured to rotate about the coupling member as the coupling member is positioned at any of a plurality of possible locations inside of the cut-out portion.

23. The apparatus of claim 20, wherein, when the handle assembly linearly slides along the coupling member in the direction parallel to the cut-out portion, the coupling member remains stationary.

24. The apparatus of claim 20, wherein the hook portion and the handle assembly are formed as a unitary structure.

* * * * *